US012638578B2

(12) United States Patent
Vollbracht et al.

(10) Patent No.: US 12,638,578 B2
(45) Date of Patent: May 26, 2026

(54) RADAR SYSTEM FOR AUTOMOTIVE APPLICATIONS

(71) Applicant: Aptiv Technologies AG, Schaffhausen (CH)

(72) Inventors: Dennis Vollbracht, Hilden (DE); Sadam Hussain Kazimi, Wuppertal (DE); Sachit Varma, Ratingen (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 324 days.

(21) Appl. No.: 18/347,368

(22) Filed: Jul. 5, 2023

(65) Prior Publication Data

US 2024/0012138 A1 Jan. 11, 2024

(30) Foreign Application Priority Data

Jul. 6, 2022 (EP) ..................................... 22183282

(51) Int. Cl.
*G01S 13/931* (2020.01)
*G01S 7/02* (2006.01)
(Continued)

(52) U.S. Cl.
CPC ............ *G01S 13/931* (2013.01); *G01S 7/025* (2013.01); *G01S 7/026* (2013.01); *G01S 7/032* (2013.01);
(Continued)

(58) Field of Classification Search
CPC ........ G01S 13/42; G01S 13/87; G01S 13/931; G01S 2013/9322; G01S 7/024;
(Continued)

(56) References Cited

U.S. PATENT DOCUMENTS 9,341,708 B2 * 5/2016 Nakamura .............. G01S 13/89
10,059,334 B1 * 8/2018 Zhu .................. G08G 1/096725
(Continued)

FOREIGN PATENT DOCUMENTS

DE 102015003115 9/2016
EP 2653882 10/2013
EP 2653882 A1 * 10/2013 ............. G01S 7/025

OTHER PUBLICATIONS

"Extended European Search Report", EP Application No. 21197464.7, Mar. 14, 2022, 10 pages.
(Continued)

*Primary Examiner* — Peter M Bythrow
(74) *Attorney, Agent, or Firm* — Harness, Dickey & Pierce, P.L.C.

(57) ABSTRACT

A radar system for a vehicle includes: a processing device having multiple transmit outputs and multiple receive inputs; a main transmit antenna to transmit main radar waves essentially parallel to a road, and coupled to the processing device via a first transmit output; a main receive antenna to receive reflections of the main radar waves off objects, and coupled via a first receive input; a first street condition monitoring (SCM) transmit antenna to transmit first polarized radar waves essentially directed to the road at a first polarization, and coupled via a second transmit output; and a first SCM receive antenna to receive, at the first polarization, reflections of the polarized radar waves off the road, and coupled via a second receive input. The system can include second SCM transmit and receive antennas coupled via a third transmit output and a third receive input and operating at a second polarization.

20 Claims, 4 Drawing Sheets

(51) Int. Cl.
    *G01S 7/03*         (2006.01)
    *H01Q 1/32*       (2006.01)

(52) U.S. Cl.
    CPC .... *H01Q 1/3233* (2013.01); *G01S 2013/9322*
                                           (2020.01)

(58) Field of Classification Search
    CPC .......... G01S 7/025; G01S 7/026; G01S 7/032;
                    H01Q 1/3233; H01Q 21/005; H01Q
                                             21/24
    See application file for complete search history.

(56)                   References Cited

U.S. PATENT DOCUMENTS

| | | | | |
|---|---|---|---|---|
| 11,460,536 | B2 * | 10/2022 | Miu | G01S 13/931 |
| 11,592,522 | B1 * | 2/2023 | Awwad | G01S 7/025 |
| 11,650,306 | B1 * | 5/2023 | DeSalvo | G01S 7/499 |
| | | | | 342/125 |
| 11,840,258 | B2 * | 12/2023 | Shalev-Shwartz | |
| | | | | B60W 30/181 |
| 11,914,046 | B2 * | 2/2024 | Hamilton | G01S 17/931 |
| 2006/0261975 | A1 * | 11/2006 | Fridthjof | B60T 8/172 |
| | | | | 340/905 |
| 2007/0241962 | A1 * | 10/2007 | Shinoda | H01Q 1/425 |
| | | | | 342/361 |
| 2016/0161609 | A1 * | 6/2016 | Tanaka | G01S 13/582 |
| | | | | 342/81 |
| 2017/0168156 | A1 * | 6/2017 | Hoare | G01S 7/417 |
| 2017/0293812 | A1 * | 10/2017 | Itoh | G08B 19/02 |
| 2018/0356511 | A1 * | 12/2018 | Buddendick | G01S 13/584 |
| 2019/0271765 | A1 * | 9/2019 | Ben Khadhra | G01S 7/025 |
| 2020/0025868 | A1 * | 1/2020 | Trummer | G01S 13/931 |
| 2020/0082722 | A1 * | 3/2020 | Beiski | G06K 7/10366 |
| 2020/0096626 | A1 * | 3/2020 | Wang | G01S 13/4454 |
| 2021/0055734 | A1 * | 2/2021 | Yokev | G08G 1/163 |
| 2021/0080568 | A1 * | 3/2021 | Brown | G01S 13/87 |
| 2021/0094577 | A1 * | 4/2021 | Shalev-Shwartz | G05D 1/0246 |
| 2021/0165071 | A1 * | 6/2021 | Takeda | G01S 7/412 |
| 2022/0302577 | A1 * | 9/2022 | Kawasaki | H01Q 21/28 |
| 2023/0087328 | A1 * | 3/2023 | Awwad | G01S 7/412 |
| | | | | 342/188 |
| 2024/0222853 | A1 * | 7/2024 | Moss | H01Q 1/2283 |

OTHER PUBLICATIONS

"Extended European Search Report", EP Application No. 22183083.9, Dec. 14, 2022, 12 pages.
"Extended European Search Report", EP Application No. 22183282.7, Dec. 22, 2022, 11 pages.

* cited by examiner

RADAR SYSTEM FOR AUTOMOTIVE APPLICATIONS

INCORPORATION BY REFERENCE

This application claims priority to European Patent Application No. EP22183282.7, filed Jul. 6, 2022, the disclosure of which is incorporated by reference in its entirety.

BACKGROUND

Modern cars often comprise electromagnetic sensors that are for example part of advanced driver-assistance systems (ADAS) such as adaptive cruise control, lane change assistance, or intersection assistance, to name just a few examples. An example of such an electromagnetic sensor is a radar (radio detection and ranging) sensor which is used for detecting and locating objects such as cars, pedestrians, obstacles, etc. The radar sensor emits an electromagnetic signal, usually as a directed beam, with a specific frequency, such as for example 77 GHz. The signal is reflected off an object. The reflected signal (sometimes called an "echo") is received, detected by the radar sensor, and further processed to cause corresponding actions.

SUMMARY

Described implementations relate generally to a radar system for automotive applications that are capable of detecting and locating objects as well as performing street condition monitoring.

The described radar systems are configured to be installed at a vehicle. An example radar system comprises: a processing device having a plurality of transmit outputs and a plurality of receive inputs; at least one main transmit antenna being configured to transmit main radar waves essentially parallel to a road on which the vehicle is standing or driving, and being communicatively coupled to the processing device via a first transmit output; at least one main receive antenna being configured to receive reflections of the main radar waves off objects on the road, and being communicatively coupled to the processing device via a first receive input; a first street condition monitoring (SCM) transmit antenna being configured to transmit first polarized radar waves essentially directed to the road at a first polarization, and being communicatively coupled to the processing device via a second transmit output; a second SCM transmit antenna being configured to transmit second polarized radar waves essentially directed to the road at a second polarization different from the first polarization, and being communicatively coupled to the processing device via a third transmit output; and a first SCM receive antenna being configured to receive, at the first polarization, reflections of the polarized radar waves off the road, and being communicatively coupled to the processing device via a second receive input; and a second SCM receive antenna being configured to receive, at the second polarization, reflections of the polarized radar waves off the road, and being communicatively coupled to the processing device via a third receive input.

The main antennas can be used for object detection and location and may radiate and receive essentially parallel to the road. Essentially parallel in the context of this application can mean that the longitudinal axis of the main lobe of the antenna's gain pattern is more or less parallel to the street (assuming a flat road), e.g., within ±5°. The SCM antennas can be used for street condition monitoring and may be essentially directed to the road, which can mean in this application that the longitudinal axes of the main lobes of their gain patterns are tilted and point to the road. The SCM antennas can be realized as polarimetric antennas meaning that they are configured to emit and receive at a certain polarization. Examples of such polarizations include horizontal and vertical linear polarization as well as left-handed and right-handed circular polarization. The SCM antennas can comprise at least one pair of a transmit and a receive antenna having a first polarization and another pair of a transmit and a receive antenna having a second polarization different from the first polarization. This allows for street condition monitoring, e.g., determining street surface and precipitation, by for instance measuring the co-polarized and cross-polarized backscattering coefficients as described in European patent application No. 21197464.7.

The main and SCM antennas can be operatively coupled to a corresponding processing device. The processing device may comprise a number of transmit outputs and of receive inputs. The transmit antennas may be communicatively coupled to the transmit outputs, and the receive antennas may be communicatively coupled to the receive inputs. The processing device allows a system to drive the transmit antennas and to receive from the receive antennas. Using certain modulation schemes, the system can have the main antennas scan at different azimuth angles in order to detect and locate objects above road levels. Simultaneously or intermittently, the SCM antennas may be operated in order to perform street condition monitoring measurements. Thus, the processing device allows for operating the antennas in order to obtain the most accurate and useful information about the surroundings of the vehicle.

According to certain implementations, the antennas can be regarded as being coupled to the processing device via dedicated channels. Thus, the first transmit output may be different from the second transmit output, and/or the second transmit output may be different from the third transmit output. The first receive input may be different from the second receive input, and/or the second receive input may be different from the third receive input. Dedicated channels have an advantage that the main antennas can be operated simultaneously with the SCM antennas, for example at the same center frequency with different phase codes to distinguish between radar signals from different antenna types. Also, the main antennas can be completely isolated from the SCM antennas, and there is no crosstalk/interference between both types of antennas. Having separate dedicated channels of the MM IC for SCM antennas, these can be designed very wideband to provide an operational bandwidth of, for example, 5 GHz from 76 to 81 GHz. The wide bandwidth of the SCM antennas provides the freedom of selecting the center frequency between 76 to 81 GHz.

Alternatively, the processing device may operate the antennas alternately, e.g. one antenna type at a time. For example, the main antennas may operate at a different time or frequency than the SCM antennas.

The described coupling of the antennas to the processing device via dedicated inputs and outputs also has the advantage that existing radar system designs can be reused simply by replacing some of the main antennas with SCM antennas. Thus, there is no requirement for a complete redesign of the radar system.

Accordingly, certain described implementations provide an integrated radar system for automotive applications that are at the same time capable of object detection and location as well as street condition monitoring. This meets the requirements of autonomous driving applications which require reliable and detailed information about the vehicular surroundings. Importantly, by providing just a single radar system in some cases, the integration into the vehicle is simplified, and costs are significantly reduced as additional radar systems would require additional space, a separate interface to the vehicle's control systems, and additional end-of-line testing at the original equipment manufacturer (OEM).

The main lobes of the beam patterns of the SCM transmit and receive antennas may be tilted relative to the main lobes of the beam patterns of the main transmit and receive antennas. As described above, this allows the SCM antennas to perform street condition monitoring by transmitting polarized radar beams onto the street and by measuring its backscattering coefficients at at least two different polarizations. At the same time, the main antennas are able to detect and locate any objects above the road level, such as pedestrians, vehicles, or road boundaries.

The SCM antennas may be configured to cover an elevation angle of −75° to 0°, such as −40° to −5°, or even −12° to −8° (e.g., −10°) responsive to the radar system being installed at a vehicle. An angle of between −90° and 0° allows the SCM antennas to measure the condition of the road, whereas the main antennas can perform object detection and location. An angle of −12° to −8°, in particular of about −10°, can advantageously illuminate the road at a range of about 3 m to the radar system when mounted on a vehicle at a "typical" height of 0.5 m from the ground. This range is close enough to the vehicle in order to provide information about the immediately surrounding section of the road. On the other hand, it leads to a sufficiently pointed incidence angle relative to the road.

The SCM receive antennas may have a higher dynamic range than the at least one main receive antenna. The high dynamic range allows the detection of multiple kinds of street conditions. As the amplitudes of radar waves backscattered off the street are rather low due to the flat incidence angle as compared to reflections off objects such as cars, the high dynamic range of the SCM antennas allows a reliable classification of the street condition even under such circumstances. Generally, the usage of an antenna having a high dynamic range allows for detection of weak signals with a reasonable signal-to-noise ratio.

The SCM antennas may have a bandwidth of at least 2 GHz, such as at least 3 GHz, or even at least 4 GHz (e.g., at least 5 GHz). For example, the SCM antennas may be wideband antennas with an operational bandwidth of 5 GHz from 76 to 81 GHz. As the antenna is wideband, the radiation frequency can either be controlled by the input chirp or by fine tuning the antenna operational bandwidth. This is advantageous for the limited bandwidth restrictions of the ITU in certain countries. In addition, a wide band antenna may be operated at different center frequencies which allows for adapting the operational frequency to different requirements.

A high bandwidth of the SCM antennas also allows use of different frequencies or frequency bands for street condition monitoring. This allows for the frequency-dependence of the backscattering coefficients to be included in the street condition classification in order to obtain more accurate results. Thus, a method for determining the condition of a road by using a radar system as disclosed herein may not only use different polarizations but also at least two different frequencies, which can add an additional dimension to the classification process. Therefore, the processing device may be configured to operate the SCM antennas at at least two different frequency bands.

The SCM antennas may comprise slotted substrate-integrated waveguide (SW) arrays or slotted air waveguide (AWG) arrays. Slot antennas in substrate-integrated waveguide (SW) arrays or air waveguide (AWG) arrays can have higher polarization purity, e.g., a high isolation between co-polarized and cross-polarized radar waves, compared to patch arrays which may be more lossy. As the determination of the co-polarized and cross-polarized backscattering coefficients is central to street condition monitoring, a high polarization purity of the SCM transmit and receive antennas is relevant for a reliable classification of the road condition.

The SCM antennas may comprise a one-way co-polarization to cross-polarization isolation of at least 22.4 dB, such as at least 27.3 dB, or even at least 32.3 dB (e.g., at least 37.3 dB). One-way isolation in this context is understood as the isolation of a single transmit or receive antenna. A high co-polarization to cross-polarization isolation is relevant for reliably classifying the street condition because it relies on an accurate determination of the co-polarized and cross-polarized backscattering coefficients. Hence, the contribution of the antennas to these coefficients due to polarization impurities should be as low as reasonably possible for superior results.

The gain pattern of the SCM antennas may have a half-power beamwidth of at most 45°, such as at most 35°, or even at most 25° (e.g., at most 14.5°). The half-power beamwidth is also known as the angle at which the antenna gain drops below 3 dB. The beamwidth is designed this way to illuminate only or primarily the street in front of the car and not to receive any, or much, energy from the sidewalks or other potential targets other than the street. For example, at a beamwidth of 14.5°, a height of the antenna of 0.5 m above ground, and an elevation angle of −10°, the antenna can cover an area with a diameter of roughly 77 cm, wherein its midpoint would be at a distance of roughly 3 m to the antenna.

The main antennas may be configured to operate at a first center frequency, and the SCM antennas may be configured to operate at the first center or same frequency or at a second center frequency different from the first center frequency. As mentioned, this allows for the main and SCM antennas to be operated simultaneously and to isolate their signals by way of frequency. In case of simultaneous operation, the processing device may be configured to operate its inputs and/or outputs with different center frequencies. Alternatively, the processing device may comprise a first MMIC and a second MMIC operating at different frequencies.

The processing device may comprise at least one monolithic microwave integrated circuit (MMIC). In an example embodiment, the processing device comprises two MMICs. MMICs allow a system to operate the antennas and perform functions such as mixing, amplification, and modulation. They are rather small and can be produced at low costs.

With the usage of frequency-selective elements as described herein, a main antenna and an SCM antenna may share a single input or output, respectively, of an MMIC. This allows a system to reuse existing designs and to add the SCM antennas at reasonable costs and efforts.

The antennas may be communicatively coupled to the processing device via waveguides. The waveguides may be implemented as vias on a substrate. Thus, the antennas may be integrated with the processing device on the same substrate, and the operative coupling between the antennas and the processing device, including e.g. a MMIC, may be done via waveguides. This allows for high integration, small form factor, and low production costs.

The processing device may be configured to operate each of the antennas individually. As described above, this allows a system to separate the operation of the main antennas from the operation of the SCM antennas. In such cases, both antenna types can be well isolated and do not influence each other. The integration of the SCM antennas in existing designs may be done by replacing some of the main antennas.

The radar system may further comprise: a plurality of main transmit antennas being configured to transmit main radar waves essentially parallel to a road on which the vehicle is standing or driving, and each being communicatively coupled to the processing device via a corresponding dedicated transmit output; and a plurality of main receive antennas being configured to receive reflections of the main radar waves off objects on the road, and each being communicatively coupled to the processing device via a corresponding dedicated receive input. The main antennas may thus be operated in a multiple input multiple output (MIMO) configuration allowing for a high spatial resolution, including in an azimuthal direction.

The first polarization may be a vertical polarization, and the second polarization may be a horizontal polarization. Linear polarized antennas can be realized with a rather simple design using, e.g., slot antennas in substrate-integrated waveguide (SIW) or air waveguide (AWG) arrays. In addition, street condition monitoring using linearly polarized radar waves can lead to accurate classification results as shown, for example, in European patent application No. 21197464.7 of the same applicant.

Alternatively, the first polarization may be a right-handed circular polarization, and the second polarization may be a left-handed circular polarization. In general, in addition to linear polarization, additional information can be detected with circular polarized signals that may be useful for street condition monitoring.

BRIEF DESCRIPTION OF THE DRAWINGS

Example embodiments in accordance with the present invention are described in more detail in the following detailed description with reference to the following figures.

DETAILED DESCRIPTION

In the context of autonomous driving, detailed information about the surroundings of an autonomous vehicle can be important, such as the condition of the street on which the vehicle is travelling. This includes both the surface material of the street such as asphalt, concrete, sand, etc. and possible precipitation such as rain, snow, ice, etc. Special or dedicated radar systems can be used for such street condition monitoring (SCM) applications. For example, European patent application No. 21197464.7 of the same applicant discloses a method and a radar system for determining the condition of a road, e.g., in the environment of a vehicle. The method can involve such a special or dedicated radar system that may be installed at the vehicle and that comprises radar transmitter and receiving units configured to transmit and to receive, respectively, radar waves having at least two different polarizations.

For the sake of brevity, only a few embodiments are described below. The person skilled in the art will recognize that the features described with reference to these specific embodiments may be modified and combined in different ways and that individual features may also be omitted. The general explanations in the sections above also apply to the more detailed explanations below.

Figure 1:
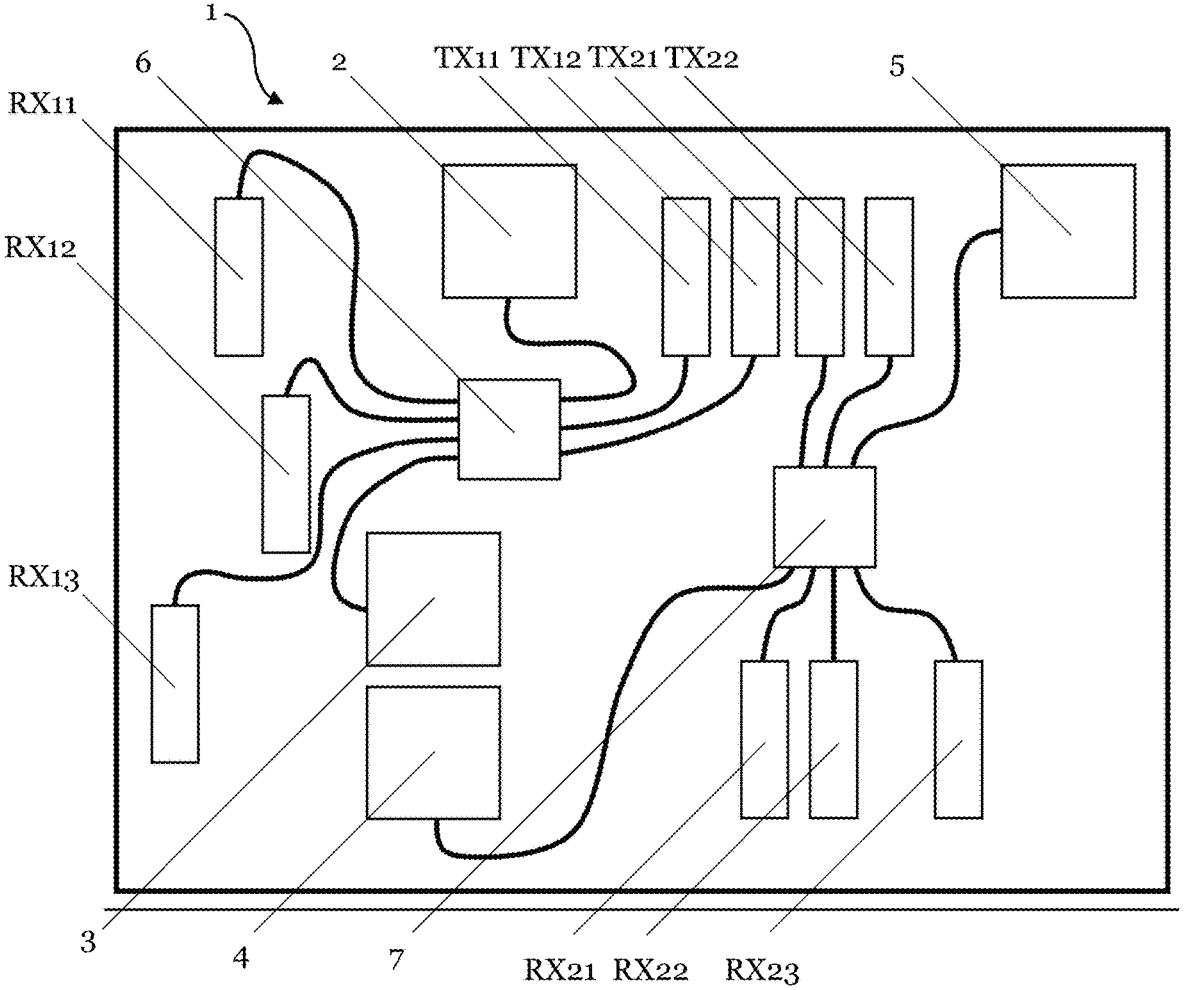
FIG. 1: A schematic illustrating an example embodiment of a radar system according to example implementations with main and SCM antennas.

FIG. 1 illustrates example embodiments of a radar system according to described implementations. The example radar system integrates main transmit antennas TX11, TX12, TX21, and TX22; main receive antennas RX11, RX12, RX13, RX21, RX22, and RX23; an SCM transmit antenna with horizontal polarization 2; an SCM transmit antenna with vertical polarization 5; an SCM receive antenna with horizontal polarization 4; and an SCM receive antenna with vertical polarization 3. The main antennas can be configured for object detection and location and may be realized as patch arrays in the example of FIG. 1. They can also be implemented as slot antennas. Thus, the main transmit antennas TX11, TX12, TX21, and TX22 can be configured to transmit main radar waves essentially parallel to a road on which the vehicle, in which the sensor system is to be mounted, is standing or driving. The main receive antennas RX11, RX12, RX13, RX21, RX22, and RX23 can be configured to receive reflections of the main radar waves off objects on the road. As such, the main antennas form a 2×3 MIMO (multiple input multiple output) configuration. It should be noted that the invention is not limited to a particular number of main transmit and receive antennas and that different numbers and configurations may be used. Thus, a different MIMO configuration such as 4×4 may be used.

The radar system may generally be implemented on a printed circuit board (PCB) which acts as a sandwiched structure including a substrate for the components of the radar system. Some components, such as waveguides, may be implemented directly in the substrate.

Each of the main transmit antennas TX11 and TX12 is operatively coupled to an output of a first MMIC 6, and each of the main transmit antennas TX21 and TX22 is operatively coupled to an output of a second MMIC 7. Likewise, each of the main receive antennas RX11, RX12, and RX13 is operatively coupled to an input of the first MMIC 6, and each of the main receive antennas RX21, RX22, and RX23 is operatively coupled to an input of the second MMIC 7. Thus, each of the main antennas is coupled to a corresponding MMIC by a dedicated channel which it does not share with another antenna. It should be noted that the number of main antennas and the number of MMICs is not limited to the number shown in the example embodiment of FIG. 1.

In the illustrated example, the SCM transmit antenna with horizontal polarization 2 is operatively coupled to an output of the first MMIC 6, and the SCM receive antenna with vertical polarization 3 is operatively coupled to an input of the first MMIC 6. Likewise, the SCM receive antenna with horizontal polarization 4 is coupled to input of the second MMIC 7, and the SCM transmit antenna with vertical polarization 5 is operatively coupled to an output of the second MM IC 7. Therefore, the SCM antennas can be coupled to the MMICs via dedicated channels and need not share a channel with another antenna.

The antennas in the example embodiment of FIG. 1 can be operatively coupled to the MMICs 6 and 7 via waveguides. The waveguides may be implemented, for instance, as substrate integrated waveguides (SIW) on a PCB.

The SCM antennas 2-5 in the illustrated example embodiment have a horizontal and a vertical linear polarization and, thus, are polarimetric antennas. However, the invention is not limited to a particular type of polarization, and the polarization is not necessarily orthogonal. For example, left-handed and right-handed polarized antennas may be used additionally or alternatively. The SCM transmit antennas 2 and 5 can radiate radar waves with a corresponding polarization, and the SCM receive antennas 3 and 4 can receive radar waves with a corresponding polarization and suppress radar waves having a different polarization. Thus, the horizontally polarized SCM antennas 2 and 4 may have a high gain at horizontal polarization but a small gain at vertical polarization. Correspondingly, the vertically polarized SCM antennas 3 and 5 may have a high gain at vertical polarization but a small gain at horizontal polarization.

The SCM transmit antennas 2 and 5 can be configured to transmit polarized radar waves essentially directed to the road at a corresponding polarization, and the SCM receive antennas 3 and 4 can be configured to receive, at a corresponding polarization, reflections (e.g., backscattered radar waves) of the polarized radar waves off the road. Although the waves incident on the road have essentially just a single polarization, the road and/or any covering (e.g., rain, ice, snow) may cause the reflected waves to contain a mixture of both polarizations. This effect can be exploited, and a corresponding classification process is described briefly below.

The radar sensor in the example embodiment of FIG. 1 also comprises two monolithic microwave integrated circuits (MMICs) 6 and 7. An MM IC allows a system to operate the antennas and performs functions such as mixing, amplification, and modulation. The MMICs 6 and 7 can operate both the main and the SCM antennas using certain modulation schemes. As mentioned, the invention is not limited to using two MMICs. It is also possible to use just a single MMIC or more than two.

The main antennas TX11, TX12, TX21, TX22, RX11, RX12, RX13, RX21, RX22, and RX23 and the SCM antennas 2-5 may operate at different center frequencies. In the example of FIG. 1, the main antennas can operate at a center frequency of 76.5 GHz while the SCM antennas can operate at a center frequency of 80.5 GHz. Other center frequencies may be used as well.

Figure 2:
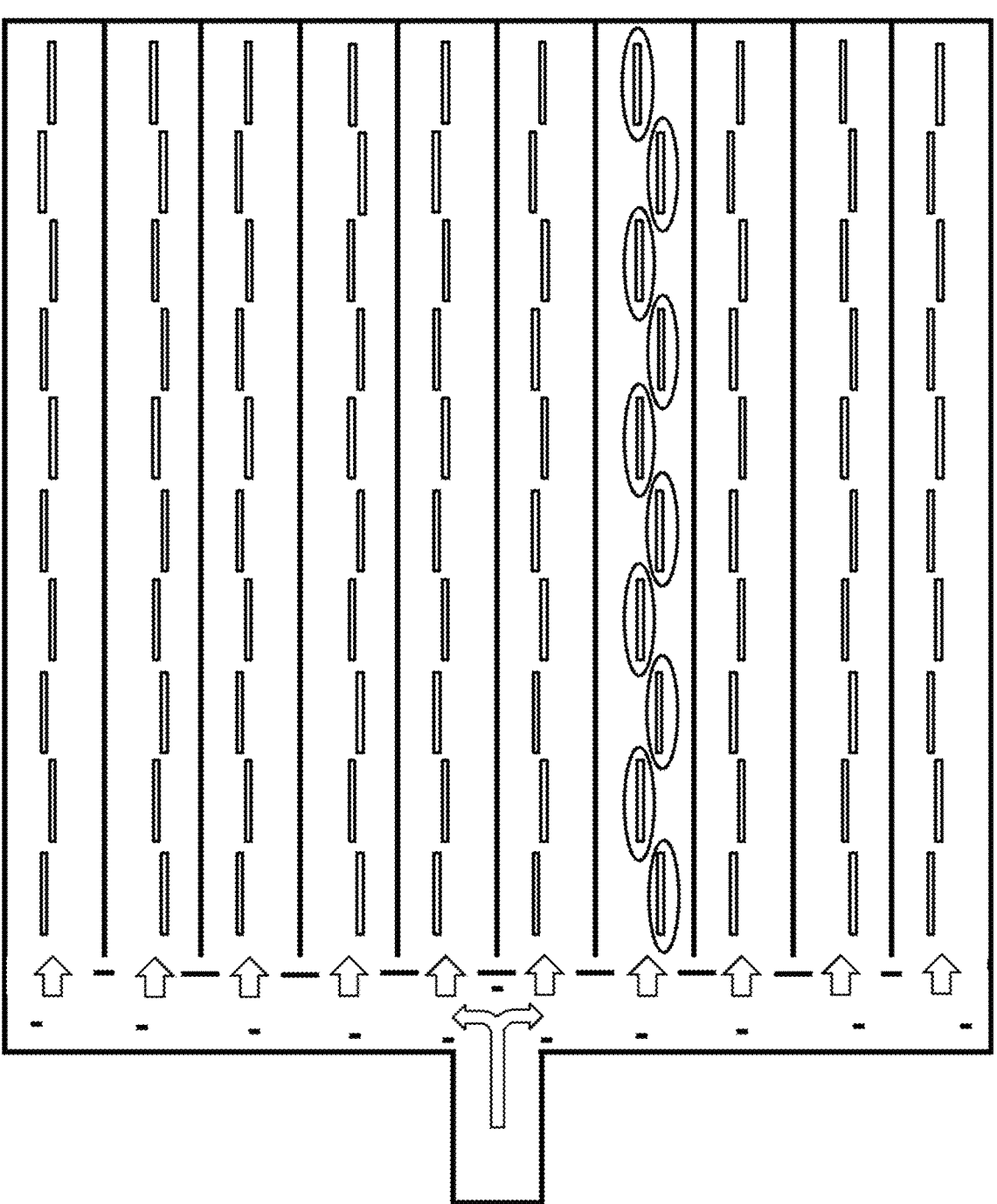
FIG. 2: An example configuration of an SCM antenna having horizontal polarization.
Figure 3:
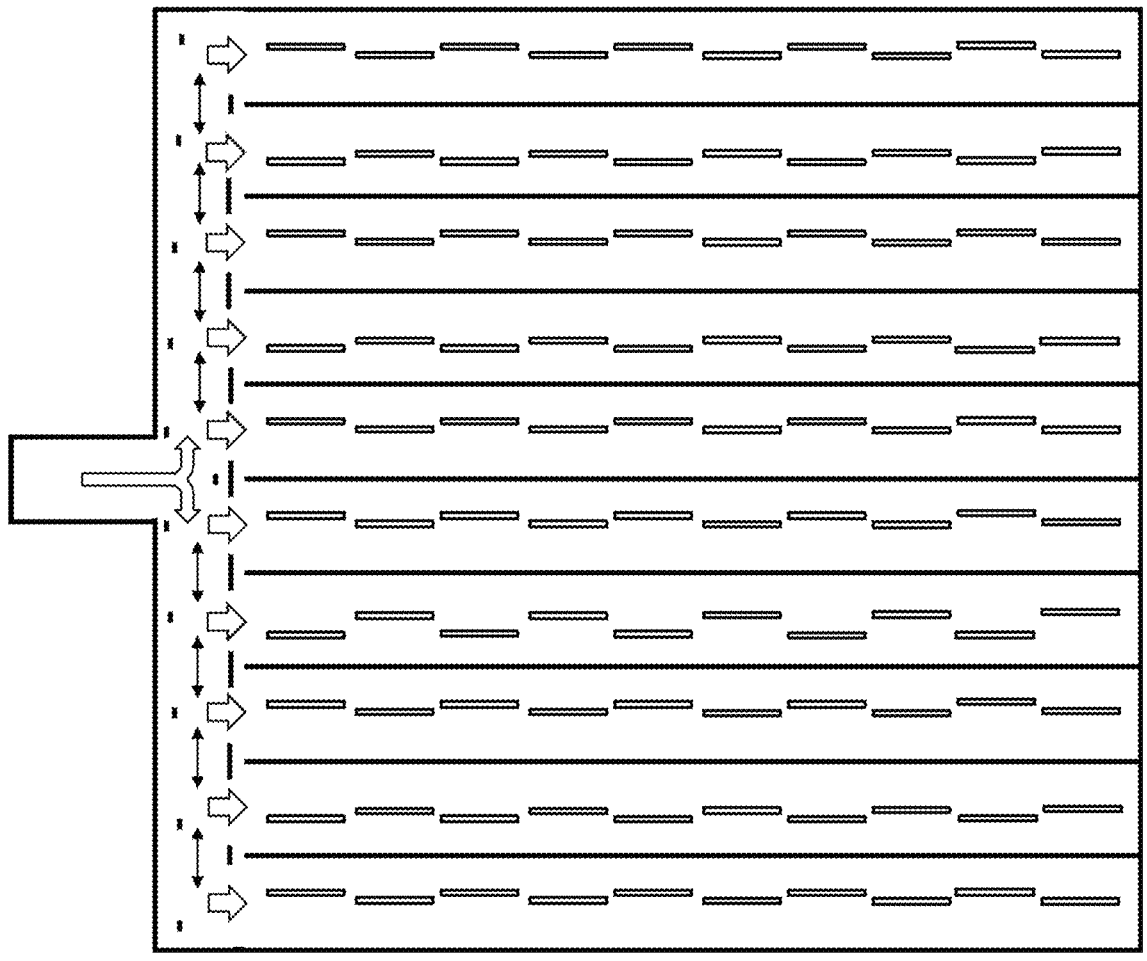
FIG. 3: An example configuration of an SCM antenna having vertical polarization.

Example designs of the SCM antennas 2-5 that can be used with disclosed implementations are described in more detail with respect to FIGS. 2 and 3. These figures show SCM antennas designed as slot antennas in substrate-integrated waveguide (SIW) or air waveguide (AWG) arrays. Such types of antennas can have higher polarization purity (high co/cross pol isolation) compared to patch arrays, which may be more lossy. Thus, the antenna designs shown in FIGS. 2 and 3 can allow for a 1-way co-pol/cross-pol isolation of 37 dB. FIG. 2 shows an SCM antenna for horizontal polarization while FIG. 3 shows an SCM antenna for vertical polarization. In the depicted examples, the antennas can be realized as an array of 10×10 slots having a maximum gain of 24.7 dB at an elevation angle of −10° (e.g., tilted down at the road when mounted in a vehicle). Other example configurations include an 8×8 antenna array having a maximum gain of 22.8 dB at an elevation angle of −10°, a 6×6 antenna array having a maximum gain of 20.3 dB at an elevation angle of −10°, and a 4×4 antenna array having a maximum gain of 16.7 dB at an elevation angle of −10°.

The slotted array for horizontal polarization shown in FIG. 2 is fed from the bottom, wherein each slot may be placed such that it provides a phase shift for the radiating beam to be tilted downwards in elevation. On the other hand, the slotted array for vertical polarization is fed from the side as shown in FIG. 3. In this case, the meander path lines are designed to produce a phase difference to make the arrays (bottom to top) radiate with a beam tilted downwards in elevation.

It may be generally observed that the higher the gain the narrower is the beamwidth of the SCM antennas. The main lobe of the SCM antennas is tilted such that it covers a range up to 10 m in front of the vehicle, into which the sensor system is mounted, with high signal-to-noise ratio (SNR). The elevation angle θ can be calculated using the following formula, assuming that h is the mounting height of the sensor and r is the desired range of the SCM antennas: $\theta=\tan^{-1}$ (h/r). In an example, the radar sensor is mounted at a height of 0.5 m and has a range of 2.99 m at an elevation angle of −9.49°.

The 3 dB or half-power beamwidth (HPBW) area coverage in azimuth with different elevation angles of an antenna with a diameter of 18 mm at 80.5 GHz can be calculated using the following equation:

$$HPBW = 70\left(\frac{\lambda}{D}\right),$$

wherein λ is the wavelength, D is the longest dimension of the antenna, and 70 is an antenna-dependent factor varying for different antenna types. Using basic trigonometry, it is observed that, for example at a range of 3 m and a beam tilted in elevation around −10°, the 3 dB beamwidth in azimuth is 0.77 m corresponding to an HPBW of 14.5°. Advantageously, the beamwidth is designed to illuminate only, or at least primarily, the street in front of the car and not to receive any, or at least not much, energy from the sidewalks or other targets than the street.

Next, a basic method of using the SCM antennas to classify different road conditions (street condition monitoring) is briefly explained. More details can be found in European patent application No. 21197464.7 of the same applicant which is incorporated by reference in its entirety herein.

As described above, the SCM antennas can illuminate an area of the street in front of the car by polarized radar waves and receive reflections, e.g., backscattered radar waves, at different polarizations. Horizontal and vertical polarization is assumed herein for certain examples, but other polarizations such as left-handed circular and right-handed circular may be used as well. The returns, e.g., the backscattering coefficients, received by the SCM antennas are denoted as HH (radar wave sent at horizontal polarization, reflection received at horizontal polarization), VV (radar wave sent at vertical polarization, reflection received at vertical polarization), HV (radar wave sent at horizontal polarization, reflection received at vertical polarization), and VH (radar wave sent at vertical polarization, reflection received at horizontal polarization).

In some cases, the HV return is affected the most by the roughness of the road, material of the road, and the weather conditions, while the VV return is the least affected. The difference between VV and HV can be vast, and this difference is thus able to separate different road surfaces efficiently. The differential back-scattering coefficient (HH/VV) is unable to distinguish between road surfaces, but it can follow a specific pattern: when plotting HH/VV to VV–HV, each road surface has a return in a different region and can be clustered separately. A single data point (single measurement point at one incidence angle) inside this cluster may be sufficient to classify the road types with less computational power.

When the HV returns from the street are not available, a similar method can be used by taking the difference in VV and HH street returns for this particular case. Using this method, it is worth noting that wet surfaces tend to have widely spread data points (relatively high variance) while dry surfaces tend to have data points that cluster in a small region (relatively low variance).

Thus, when the HV returns are available from the street, a single data point can be sufficient to recognize and differentiate different road conditions, which also leads to less processing and computation power. If the HV returns from the street are not available, the differential reflectivity with difference in co-pol for each incidence angle may be considered to find the surface condition using their variance, and using their VV returns the type of street can be identified.

The SCM antennas in an example embodiment have a bandwidth of 5 GHz. The bandwidth may be different in other embodiments. A high bandwidth of the SCM antennas allows for using different frequencies or frequency bands for street condition monitoring. This allows a system to include the frequency-dependence of the backscattering coefficients to be included in the street condition classification in order to obtain more accurate results. Thus, a method for determining a condition of a road by using a radar system as disclosed herein may not only use different polarizations but also at least two different frequencies.

Figure 4:
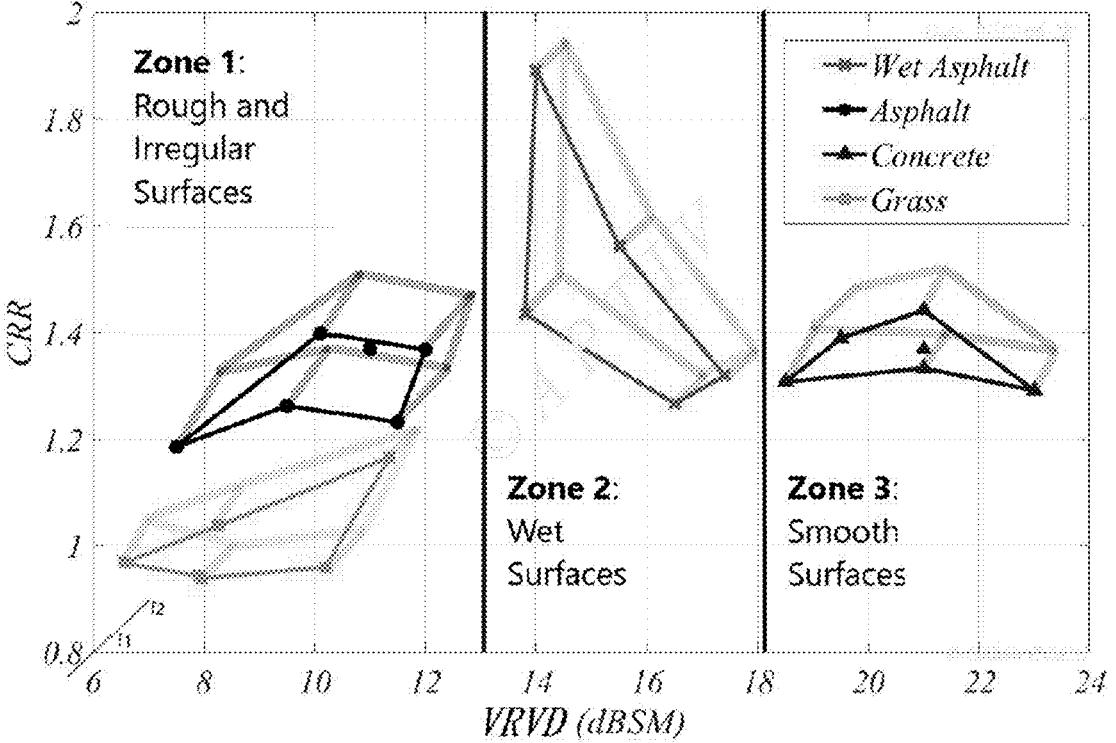
FIG. 4: An example of using dual polarization and multiple frequency steps for performing a street type and condition classification method using a radar system as described herein.

An example of using dual polarization and multiple frequency steps is shown in the diagram of FIG. 4, which depicts CRR versus VRVD for two frequency steps f1 and f2. CRR corresponds to the differential back-scattering coefficient (HH/VV) described above, whereas VRVD corresponds to the difference VV–HV described above. As can be seen, the additional frequency adds another dimension for street classification and can lead to more accurate results as the datapoints are concentrated in certain zones. Thus, zone 1 corresponds to rough and irregular surfaces, zone 2 corresponds to wet surfaces, and zone 3 corresponds to smooth surfaces. By measuring the backscattering coefficients not only in dependence on polarization but also on frequency, the assignment of the current road condition to each of the zones becomes more reliable.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A radar system comprising:
   a processing device including a plurality of transmit outputs and a plurality of receive inputs;
   at least one main transmit antenna configured to transmit main radar waves essentially parallel to a road on which a vehicle is standing or driving, the main transmit antenna communicatively coupled to the processing device via a first transmit output of the plurality of transmit outputs;
   at least one main receive antenna configured to receive reflections of the main radar waves off objects on the road, the main receive antenna communicatively coupled to the processing device via a first receive input of the plurality of receive inputs;
   a first street condition monitoring (SCM) transmit antenna configured to transmit first polarized radar waves essentially directed to the road at a first polarization, the first SCM transmit antenna communicatively coupled to the processing device via a second transmit output of the plurality of transmit outputs;
   a second SCM transmit antenna configured to transmit second polarized radar waves essentially directed to the road at a second polarization different from the first polarization, the second SCM transmit antenna communicatively coupled to the processing device via a third transmit output of the plurality of transmit outputs;
   a first SCM receive antenna configured to receive, at the first polarization, reflections of the polarized radar waves off the road, the first SCM receive antenna communicatively coupled to the processing device via a second receive input of the plurality of receive inputs; and
   a second SCM receive antenna configured to receive, at the second polarization, reflections of the polarized radar waves off the road, the second SCM receive antenna communicatively coupled to the processing device via a third receive input of the plurality of receive inputs.

2. The radar system of claim 1, wherein main lobes of beam patterns of the first and second SCM transmit and receive antennas are tilted relative to main lobes of beam patterns of the main transmit and receive antennas.

3. The radar system of claim 1, wherein the first and second SCM transmit and receive antennas are configured to cover an elevation angle of −75° to 0° responsive to the radar system being installed at the vehicle.

4. The radar system of claim 1, wherein the first and second SCM receive antennas have a higher dynamic range than the at least one main receive antenna.

5. The radar system of claim 1, wherein the first and second SCM transmit and receive antennas have a bandwidth of at least 2 GHz.

6. The radar system of claim 1, wherein the first and second SCM transmit and receive antennas comprise at least one of slotted substrate-integrated waveguide arrays or slotted air waveguide arrays.

7. The radar system of claim 1, wherein the first and second SCM transmit and receive antennas comprise a one-way co-polarization to cross-polarization isolation of at least 22.4 dB.

8. The radar system of claim 1, wherein a gain pattern of the first and second SCM transmit and receive antennas has a half-power beamwidth of at most 45°.

9. The radar system of claim 1, wherein the main transmit and receive antennas are configured to operate at a first center frequency, and the first and second SCM transmit and receive antennas are configured to operate at the first center frequency.

10. The radar system of claim 1, wherein the main transmit and receive antennas are configured to operate at a first center frequency, and the first and second SCM transmit and receive antennas are configured to operate at a second center frequency different from the first center frequency.

11. The radar system of claim 1, wherein the processing device comprises at least one monolithic microwave integrated circuit.

12. The radar system of claim 1, wherein the main transmit and receive antennas and the first and second SCM transmit and receive antennas are communicatively coupled to the processing device via waveguides.

13. The radar system of claim 1, wherein the processing device is configured to operate each of the main antennas and the SCM antennas individually.

14. The radar system of claim 1, further comprising:

a plurality of main transmit antennas configured to transmit main radar waves essentially parallel to the road on which the vehicle is standing or driving, each main transmit antenna of the plurality of main transmit antennas communicatively coupled to the processing device via a corresponding dedicated transmit output of the plurality of transmit outputs.

15. The radar system of claim 14, further comprising:

a plurality of main receive antennas configured to receive reflections off objects on the road of the main radar waves transmitted by the plurality of main transmit antennas, each main receive antenna of the plurality of main receive antennas communicatively coupled to the processing device via a corresponding dedicated receive input of the plurality of receive inputs.

16. The radar system of claim 1, wherein the first polarization comprises a vertical polarization, and the second polarization comprises a horizontal polarization.

17. The radar system of claim 1, wherein the first polarization comprises a right-handed circular polarization, and the second polarization comprises a left-handed circular polarization.

18. The radar system of claim 1, wherein the processing device is configured to operate the first and second SCM transmit and receive antennas at at least two different frequency bands.

19. A vehicle comprising a radar system, the radar system comprising:

a processing device including a plurality of transmit outputs and a plurality of receive inputs;

at least one main transmit antenna configured to transmit main radar waves essentially parallel to a road on which the vehicle is standing or driving, the main transmit antenna communicatively coupled to the processing device via a first transmit output of the plurality of transmit outputs;

at least one main receive antenna configured to receive reflections of the main radar waves off objects on the road, the main receive antenna communicatively coupled to the processing device via a first receive input of the plurality of receive inputs;

a first street condition monitoring (SCM) transmit antenna configured to transmit first polarized radar waves essentially directed to the road at a first polarization, the first SCM transmit antenna communicatively coupled to the processing device via a second transmit output of the plurality of transmit outputs;

a second SCM transmit antenna configured to transmit second polarized radar waves essentially directed to the road at a second polarization different from the first polarization, the second SCM transmit antenna communicatively coupled to the processing device via a third transmit output of the plurality of transmit outputs;

a first SCM receive antenna configured to receive, at the first polarization, reflections of the polarized radar waves off the road, the first SCM receive antenna communicatively coupled to the processing device via a second receive input of the plurality of receive inputs; and a second SCM receive antenna configured to receive, at the second polarization, reflections of the polarized radar waves off the road, the second SCM receive antenna communicatively coupled to the processing device via a third receive input of the plurality of receive inputs.

20. A method comprising:

transmitting, by at least one main transmit antenna, main radar waves essentially parallel to a road on which a vehicle is standing or driving, the main transmit antenna communicatively coupled to a processing device via a first transmit output of a plurality of transmit outputs of the processing device;

receiving, by at least one main receive antenna, reflections of the main radar waves off objects on the road, the main receive antenna communicatively coupled to the processing device via a first receive input of a plurality of receive inputs of the processing device;

transmitting, by a first street condition monitoring (SCM) transmit antenna, first polarized radar waves essentially directed to the road at a first polarization, the first SCM transmit antenna communicatively coupled to the processing device via a second transmit output of the plurality of transmit outputs;

transmitting, by a second SCM transmit antenna, second polarized radar waves essentially directed to the road at a second polarization different from the first polarization, the second SCM transmit antenna communicatively coupled to the processing device via a third transmit output of the plurality of transmit outputs;

receiving, by a first SCM receive antenna at the first polarization, reflections of the polarized radar waves off the road, the first SCM receive antenna communicatively coupled to the processing device via a second receive input of the plurality of receive inputs; and receiving, by a second SCM receive antenna at the second polarization, reflections of the polarized radar waves off the road, the second SCM receive antenna communicatively coupled to the processing device via a third receive input of the plurality of receive inputs.

* * * * *